Sept. 1, 1931.  W. J. BAUROTH  1,821,423
TROLLEY HARP
Filed Dec. 13, 1929
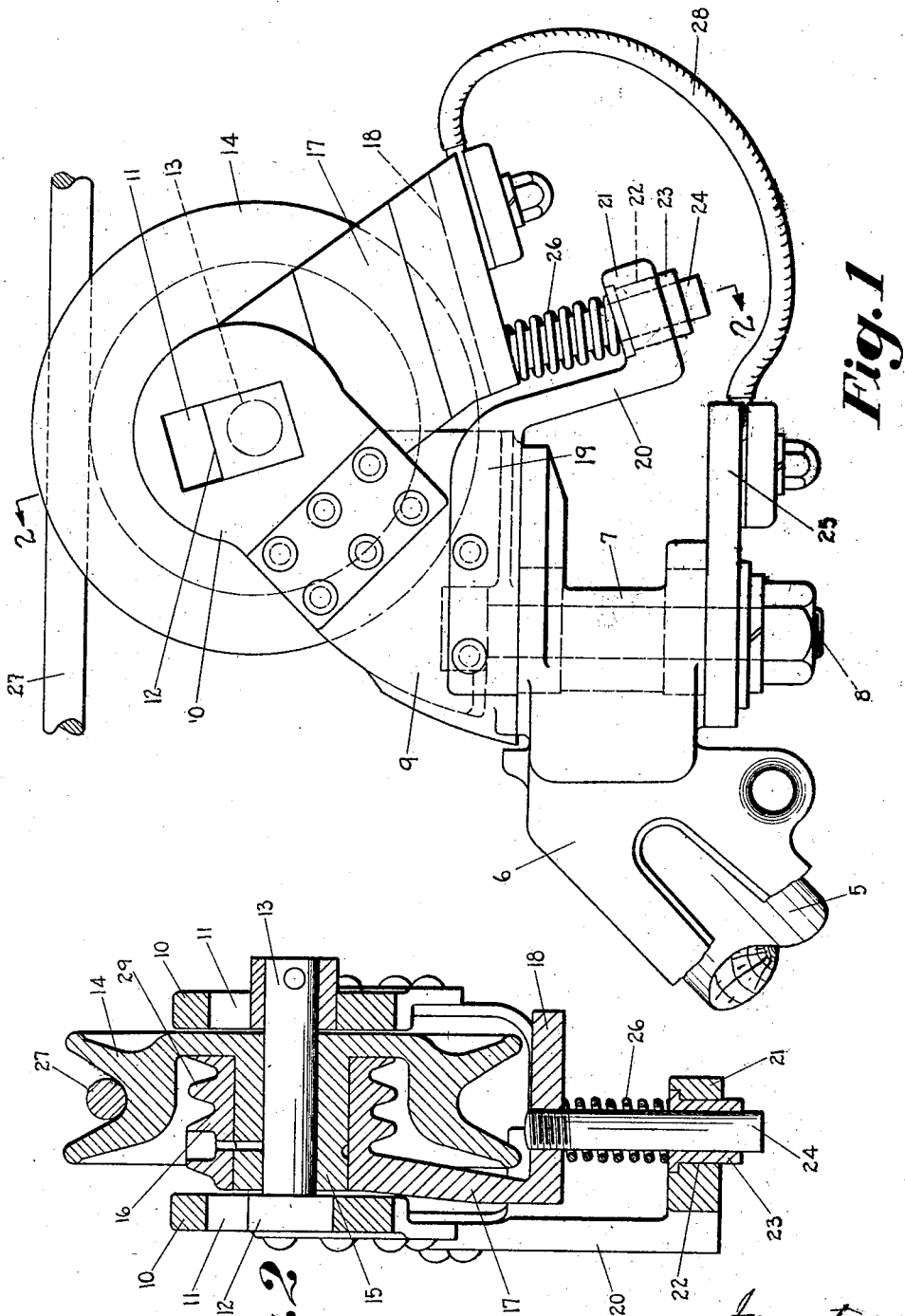

Patented Sept. 1, 1931

1,821,423

UNITED STATES PATENT OFFICE

WALTER J. BAUROTH, OF COLUMBUS, OHIO, ASSIGNOR TO THE JEFFREY MANUFACTURING COMPANY, OF COLUMBUS, OHIO, A CORPORATION OF OHIO

TROLLEY HARP

Application filed December 13, 1929. Serial No. 413,851.

The invention relates to trolley harps used on electric locomotives, cars, and the like, where an overhead trolley wire or rod is used.

The usual standard trolley harp and pole has proven unsatisfactory in some respects, due to the tendency of the trolley wheel to break contact with the conducting wire or rod. This is especially true when the trolley wheel passes over connections and switches and around curves in the conducting wire or rod. When such contact is broken, there results an arcing and intermittent surges of power as the wheel bumps along the conducting wire or rod, thereby causing unusual strain and injuries to the electric motor.

The most common type of trolley harp and pole provides a spring means at the base of the pole to maintain a constant pressure against the pole, in order to keep the trolley wheel against the conducting wire or rod. When, however, the trolley wheel is forced downwardly because of switches and connections in the conducting wire or rod, the return of the wheel is slow and inaccurate, due to the difficulty in exerting sufficient pressure at the base of the trolley pole to counteract the weight of said trolley pole.

The present invention is designed to overcome this cumbersome arrangement by placing, in addition to the structure of the standard trolley harp and pole, further means to urge and retain the trolley wheel against the conducting wire or rod, and should the trolley wheel be forced downwardly when passing over switches and connections thereon, there will result a quick and accurate return of the trolley wheel into contact therewith, thereby reducing to a minimum the injurious effects of arcing and intermittent surges of power to the motor.

With these and other objects and advantages in mind, attention is called to the drawings, in which:

Figure 1 is a side elevation of the assembled harp.

Figure 2 is a section substantially along the line 2—2 of Figure 1.

Referring more specifically to the drawings, in which like numbers indicate like parts, there is provided the usual trolley pole 5 to which is secured a casting 6. Extending from the said casting on a plane substantially perpendicular to the conducting wire is a bearing 7, preferably integral with casting 6, adapted to receive a vertical pivot pin 8, being held therein in any suitable manner, as by the nut shown. A trolley harp 9 comprising two bracket members 10 is rotatably mounted upon the pin 8; each bracket has therein a rectangular slot 11.

A shaft 13 provided with substantially square heads 12, is mounted between the brackets 10 and within the slots 11. It will be noted that the substantially square heads 12 are smaller in one dimension than the rectangular slots, thereby allowing the shaft 13 to move in said slots. The trolley wheel 14 is provided with an offset hub 15, and is mounted on the shaft 13 with which it moves toward and away from the trolley wire 27. The member 16 provided with heat dissipating fins 29 surrounds the hub 15, and has projecting downwardly on one side therefrom, a contact yoke 17, which is provided with an arm 18 which is parallel with the axis of the trolley wheel and extends therebeneath. Suitable oil cups and passages (see Fig. 2) may be provided in member 16 and hub 15.

At one side of the harp 9, there is fixed an arm 19 having an extension 20, which projects downwardly beneath the contact yoke 17, and is provided with a short, apertured arm 21 at substantially right angles to the extension 20. A bushing 23 is loosely fitted into an aperture 22 in said arm 21.

Screw threaded into the arm 18 is a rod 24, which extends through the bushing 23. A spring 26 encircles the rod 24 between the arms 18 and 21, and exerts pressure against the arm 18, thereby tending to force the shaft 13 with its supported parts upwardly in the rectangular slots 11.

A wire 28 is attached to the contact yoke 17, and connects with an arm 25 secured beneath the bearing member 7 by which the electric current, taken from the trolley wire or rod, is carried to the electric motor by wires (not shown) on the trolley pole 5.

Attention is called to the fact that with this construction, the trolley wheel will, at all times, be forced against the trolley wire. When switches and connections in the trolley wire are encountered, the downward action and subsequent return of the trolley wheel will be so quickly brought about, that the possibilities of leaving the wire altogether, are at a minimum. The prior structures using only a spring means at the base of the trolley pole, could not absorb the shock of passing over switches and connections in the trolley wire with sufficient rapidity to prevent the trolley wheel disconnecting from the trolley wire. The present invention overcomes this defect with the obvious advantages attached thereto.

It is understood that the structure, as shown and described, is only one form of my invention, which is capable of various modifications within the scope of the appended claims.

I claim:

1. In a trolley, an oscillatable harp, supporting means therefor, a wheel movable therein, a contact yoke connected to and movable with said wheel, an arm secured to said harp, and means between said yoke and arm to exert pressure against said yoke.

2. In a trolley, an oscillatable harp, supporting means therefor, a wheel movable therein, a contact yoke connected to and movable with said wheel, an arm provided with an aperture attached to said harp, a rod secured to the lowermost portion of said yoke and movable in said apertured arm, and a spring encircling said rod to exert pressure against said yoke.

3. In a trolley, an oscillatable harp, supporting means therefor, a wheel movable therein, a contact yoke connected to and movable with said wheel, an arm provided with an aperture secured to said harp and extending beneath in parallel relation to said yoke, a rod secured to the lowermost portion of said yoke and movable in said apertured arm, and a spring encircling said rod to exert pressure against said yoke.

4. In a trolley, an oscillatable harp provided with rectangular slots near its uppermost portion, supporting means therefor, a square-headed shaft movable in said slots, a wheel mounted on said shaft, and means to exert pressure against said wheel.

5. In a trolley, an oscillatable harp provided with slots near its uppermost portion, supporting means therefor, a square-headed shaft movable in said slots, a wheel provided with an offset hub mounted on said shaft, and means to exert pressure against said wheel.

6. In a trolley, an oscillatable harp provided with slots near its uppermost portion, supporting means therefor, a square-headed shaft movable in said slots, a wheel provided with an offset hub mounted on said shaft, a contact yoke connected to and movable with said wheel, and means to exert pressure against said contact yoke.

7. In a trolley, an oscillatable harp provided with slots near its uppermost portion, supporting means therefor, a square-headed shaft movable in said slots, a wheel provided with an offset hub mounted on said shaft, a contact yoke surrounding said hub, and means to exert pressure against said contact yoke.

8. In a trolley, an oscillatable harp provided with slots near its uppermost portion, supporting means therefor, a square-headed shaft movable in said slots, a wheel provided with an offset hub mounted on said shaft, a contact yoke surrounding said hub, an arm provided with an aperture attached to said harp, a rod secured to the lowermost portion of said yoke and movable in said apertured arm, and a spring encircling said rod to exert pressure against said yoke.

9. In a trolley, an oscillatable harp provided with slots near its uppermost portion, supporting means therefor, a square-headed shaft movable in said slots, a wheel provided with an offset hub mounted on said shaft, a contact yoke surrounding said hub, an arm provided with an aperture secured to said harp and extending beneath in parallel relation to said yoke, a rod secured to the lowermost portion of said yoke and movable in said apertured arm, and a spring encircling said rod to exert pressure against said yoke.

10. In a trolley, an oscillatable harp provided with slots near its uppermost portion, supporting means therefor, a square-headed shaft movable in said slots, a wheel provided with an offset hub mounted on said shaft, a contact yoke having radiating fins thereon surrounding said hub, an arm provided with an aperture secured to said harp and extending beneath in parallel relation to said yoke, a rod secured to the lowermost portion of said yoke and movable in said apertured arm, and a spring encircling said rod to exert pressure against said yoke.

11. In a trolley, an oscillatable harp provided with slots near its uppermost portion, supporting means therefor, a square-headed shaft movable in said slots, a wheel provided with an offset hub mounted on said shaft, a contact yoke having radiating fins thereon surrounding said hub, an arm provided with an aperture secured to said harp and extending beneath in parallel relation to said yoke, a rod secured to the lowermost portion of said yoke and movable in said apertured arm, a spring encircling said rod to exert pressure against said yoke, and a wire connecting said contact yoke with said supporting means to supply electrical energy to the power unit.

In testimony whereof I have hereunto set my hand.

WALTER J. BAUROTH.